US012718705B2

(12) United States Patent
Herbert et al.

(10) Patent No.: US 12,718,705 B2
(45) Date of Patent: Aug. 25, 2026

(54) SIMULATED INSTRUMENT FAILURE PANEL COVER

(71) Applicant: Textron Innovations Inc., Providence, RI (US)

(72) Inventors: Allen Thomas Herbert, Kechi, KS (US); John David Ford, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 351 days.

(21) Appl. No.: 18/599,442

(22) Filed: Mar. 8, 2024

(65) Prior Publication Data

US 2025/0285552 A1 Sep. 11, 2025

(51) Int. Cl.
*G09B 9/08* (2006.01)

(52) U.S. Cl.
CPC .................................... *G09B 9/085* (2013.01)

(58) Field of Classification Search
CPC ...... G09B 9/085; G09B 19/16; G09B 19/162; G09B 19/165; G09B 19/167
See application file for complete search history.

(56) References Cited

U.S. PATENT DOCUMENTS 2,417,317 A * 3/1947 Mcmains .............. B64C 1/1484 244/121
4,979,323 A * 12/1990 Wenkman .............. A47G 1/142 40/611.01

* cited by examiner

*Primary Examiner* — Dmitry Suhol
*Assistant Examiner* — Julie Grace Dosher
(74) *Attorney, Agent, or Firm* — Slater Matsil, LLP

(57) ABSTRACT

A training system can include a panel cover device and a first suction cup. The panel cover device can have a first panel region and a first recessed panel region. The first panel region can extend along a first plane, where the first panel region has a first elongated view slot therein and a first circular view hole therein. The first recessed panel region can extend from the first plane toward a second plane, where the first recessed panel region has a first recessed depth, and where the second plane is generally parallel with the first plane. The first suction cup can be attached to the first recessed panel region. The first suction cup can be partially within the first recessed panel region, and the first suction cup can partially extend out of the first recessed panel region toward and beyond the first plane.

19 Claims, 12 Drawing Sheets

SIMULATED INSTRUMENT FAILURE PANEL COVER

TECHNICAL FIELD

The present disclosure relates generally to a training system for simulating instrument failure, and in particular to a display covering device for obscuring selected information on an instrument display to simulate instrument failure during flight training.

BACKGROUND

Generally, during certain flight training exercises, one or more gauges or portions of an instrument panel may be covered, disabled, or concealed to simulate a failure of one or more measurement systems or instruments. For more expensive or larger aircraft or spacecraft, there may be sophisticated flight simulators in a building or room that are not in an actual aircraft or spacecraft. In such sophisticated flight simulators, there may be various modes to simulate various failure events.

Smaller and relatively less expensive aircraft, such as private or recreational aircraft, may not have flight simulators. Or if they do have a flight simulator, such flight simulator may be relatively basic and lacking the functionality to simulate a failure of certain measurement systems or instruments. Thus, during flight training exercises for a relatively small and less expensive aircraft, it is common to simulate the failure of certain measurement systems or instruments using a single-plane card or a laminated single-plane sheet of paper with various view holes and hanger holes cut out, cling film covers, or even simply using ordinary sticky notes or adhesive notes.

There are several disadvantages of using a single-plane card or a laminated single-plane sheet of paper with various view holes and hanger holes cut out to simulate instrument failure. Such devices are typically hung from instrument knobs using hanger holes, which typically does not sit against the display screen, or which is separated from the display screen by an offset spacing, and provides poor visibility from certain angles and may not provide accurate covering and revealing of information desired to be concealed and revealed during the simulation. For example, part of the information may be revealed to a student sitting directly in front of the instrument display but not revealed to a flight instructor sitting adjacent to the student and viewing the instrument display from a side angle. Also, because such devices are typically hung from instrument knobs, the device may fall off easily, or shift causing unwanted parallax, due to movement of the aircraft, such as turning, rapid attitude changes, turbulence, and vibrations.

A disadvantage of using cling film covers is that they may be difficult to place accurately and quickly, and they may be difficult to remove quickly. Often when flying and training in a relatively small aircraft, there is limited time during such training flights and exercises, and the aircraft may be flying relatively low, which may increase the safety risk of spending time and focus to accurately place and then remove cling film covers. Also, spending time and focus on placing and removing a cling film cover can interfere with a student's instrument scan, which can destabilize the flight path.

A disadvantage of using ordinary sticky notes is that they typically do not tend to lay flat on the screen, which could obscure the vision from a side angle by an instructor for certain display items intended to be revealed to the instructor and the trainee. Also, repeated use of a sticky note typically leads to less adhesion strength and the sticky note may easily fall off due to vibrations, turbulence, or air movement in the cockpit. Furthermore, adhesive and cling type covers often lose their adhesion over time and repeated use may leave residue on a display. Hence, there is a need for an improved way to simulate measurement or instrument failure for flight training exercises.

SUMMARY

A training system embodiment includes a panel cover device and a first suction cup. In the embodiment, the panel cover device has a first panel region and a first recessed panel region. In the embodiment, the first panel region extends along a first plane, where the first panel region has a first elongated view slot therein and a first circular view hole therein. In the embodiment, the first recessed panel region extends from the first plane toward a second plane, where the first recessed panel region has a first recessed depth, and where the second plane is generally parallel with the first plane. In the embodiment, the first suction cup is attached to the first recessed panel region. In the embodiment, the first suction cup is partially within the first recessed panel region, and the first suction cup partially extends out of the first recessed panel region toward and beyond the first plane.

A flight training system embodiment includes a panel cover device. In the embodiment, the panel cover device has a first panel region, a first side tab, a second side tab, and a first recessed panel region, where the first panel region extends along a first plane, where the first panel region has a first elongated view slot therein and a first circular view hole therein, where the first side tab extends from a first side of the first panel region, where the first side tab has a first side tab transition region and a first side tab notch region, where the first side tab notch region has a first notch at a first distal end of the first side tab, where at least part of the first side tab notch region is at a second plane, where the second plane is parallel with the first plane, where the first side tab transition region extends between the first panel region and the first side tab notch region, where the first side tab transition region extends and transitions from the first plane to the second plane, where the second side tab extends from a second side of the first panel region, where the second side tab has a second side tab transition region and a second side tab notch region, where the second side tab notch region has a second notch at a second distal end of the second side tab, where at least part of the second side tab notch region is at the second plane, where the second side tab transition region extends between the first panel region and the second side tab notch region, where the second side tab transition region extends and transitions from the first plane to the second plane, where the first recessed panel region extends from the first plane toward the second plane and has a first recessed depth, where a first suction cup attached to the first recessed panel region, where the first suction cup is partially within the first recessed panel region, where the first suction cup partially extends out of the first recessed panel region beyond the first plane, where a first handle extends from the first plane toward the second plane, and where the first handle extends beyond the second plane.

A method embodiment of manufacturing a training system includes forming panel cover device that has a first panel region, a first elongated view slot, a first circular view hole, a first side tab, a first notch, a second side tab, a second notch, and a first recessed panel region, as an integral piece, where the first elongated view slot is formed through the first panel region, where the first circular view hole is formed through the first panel region, where the first side tab extends from a first side of the first panel region, where the first side tab includes a first side tab transition region and a first side tab notch region, where the first side tab notch region includes the first notch formed therethrough at a first distal end of the first side tab, where the first panel region extends along a first plane, where at least part of the first side tab notch region is at a second plane, where the second plane is generally parallel with the first plane, where the first side tab transition region extends between the first panel region and the first side tab notch region, where the first side tab transition region extends and transitions from the first plane to the second plane, where the second side tab extends from a second side of the first panel region, where the second side tab includes a second side tab transition region and a second side tab notch region, where the second side tab notch region includes the second notch formed therethrough at a second distal end of the second side tab, where at least part of the second side tab notch region is at the second plane, where the second side tab transition region extends between the first panel region and the second side tab notch region, where the second side tab transition region extends and transitions from the first plane to the second plane, and where the first recessed panel region extends from the first plane toward the second plane and has a first recessed depth, and attaching a first suction cup to the first recessed panel region, such that the first suction cup is partially within the first recessed panel region and partially extending out of the first recessed panel region beyond the first plane.

BRIEF DESCRIPTION OF THE DRAWINGS

The above and other features and advantages of the present disclosure can be more apparent based on the following detailed description taken in conjunction with the accompanying drawings, in which.

DETAILED DESCRIPTION OF ILLUSTRATIVE EMBODIMENTS

Figure 1:
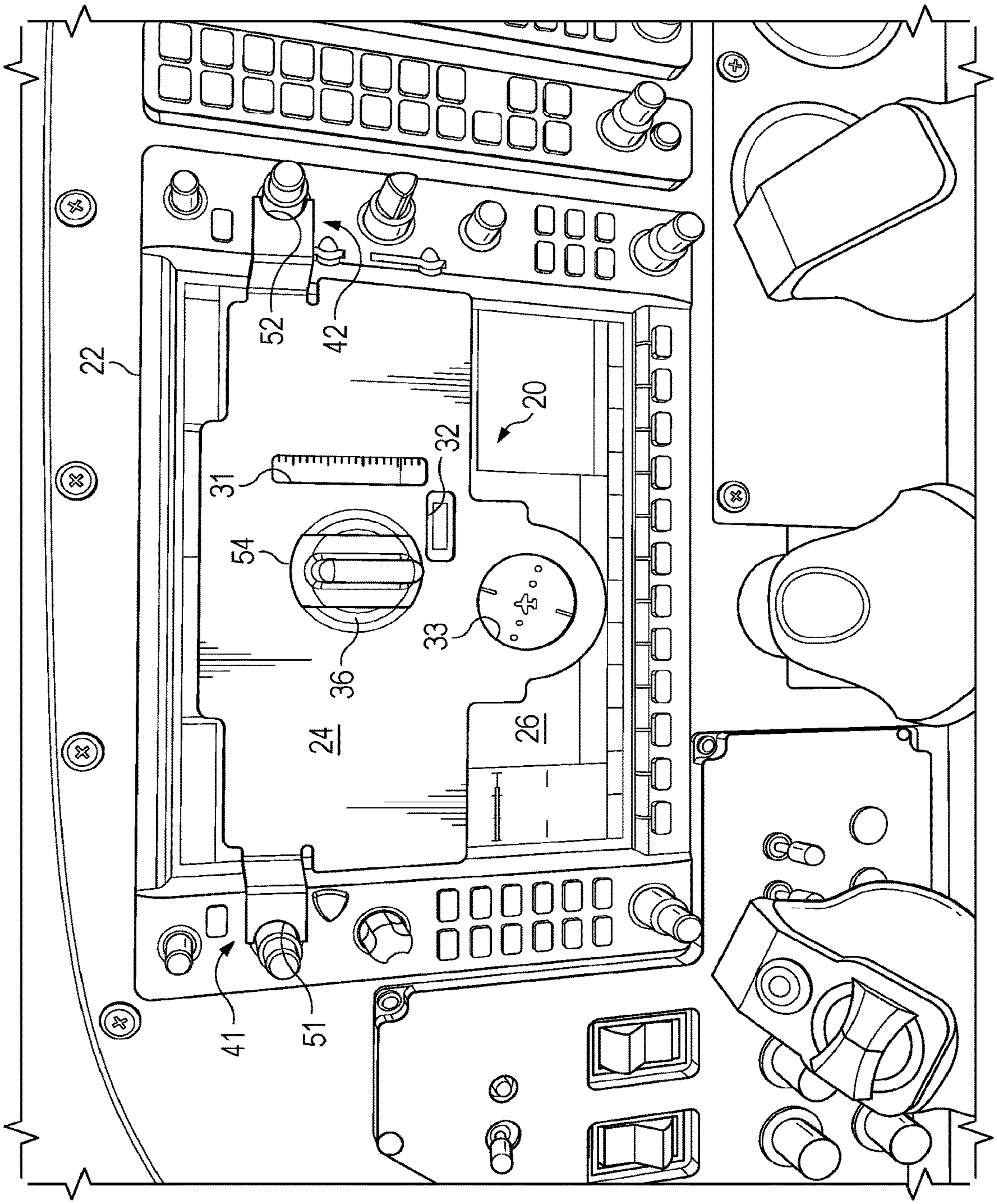
FIG. 1 is front view of a training system installed on an instrument panel, according to some embodiments.

Referring now to the drawings, wherein like reference numbers may be used herein to designate like or similar elements throughout the various views, illustrative and example embodiments are shown and described. The figures are not necessarily drawn to scale, and in some instances the drawings can be exaggerated or simplified in places for illustrative purposes. One of ordinary skill in the art? can appreciate many possible applications and variations for other embodiments based on the following illustrative and example embodiments provided in the present disclosure.

Some embodiments of the present disclosure provide a flight training system that may be used during flight training exercises to simulate an instrument failure scenario. A flight instructor may use such system of an embodiment to educate and train a pilot or student pilot during actual flight for how to react and adapt to a situation in which certain measurement instruments or instrument information displayed have failed. A flight instructor may simulate such instrument failure while the pilot or pilot trainee is actually flying by quickly, accurately, and easily covering certain information on the instrument panel flight display using a training panel cover device according to some embodiments of the present disclosure, and then quickly and easily remove such training panel cover device after the training exercise is completed, without damaging or altering the actual functionality of the instrument panel and display screen. Thus, after the training panel cover device of some embodiments is removed, the instrument panel may remain fully usable and functional to resume flying with use of all information normally provided by the given instrument panel.

Some embodiments of the present disclosure provide a way to simulate failure of air data computer (ADC) and altitude and heading reference system (AHRS) instruments to train partial panel instrument flying skills. Some embodiments of the present disclosure provide partial panel covering of the instrument display while still revealing at least some minimum information and data that may remain available and valid after an ADC or AHRS failure, such as glideslope marker, glidepath marker, course deviation indicator, course selection, bearing pointer, bearing pointer data fields, lower bezel soft button functions and fields, flight management system window, traffic map, navigation map, annunciator field, autopilot mode indicator, flight director mode indicator, or any combination thereof. For some embodiments of the present disclosure, the following information may be concealed while simulating instrument failure: airspeed, altitude, vertical speed indicator, magnetic heading, attitude, altitude pre-selector, heading bug, or any combination thereof, for example.

Many newer or upgraded small aircraft now have a digital instrument panel having a glass display screen for displaying multiple items of information, which is often referred to as a glass panel platform, rather than having a separate dial gauge, such as a round analog gauge, for each measurement or instrument. Some embodiments of the present disclosure are configured and adapted to fit on a given digital instrument panel to simulate instrument failure that would disable or not display one or more measurements or instrument information outputs.

One example of a digital instrument panel for relatively smaller and recreational aircraft is a model named G1000 and G1000 Nxi manufactured by Garmin, which may be compatible with the many different aircrafts. Some embodiments may be adapted and configured for any Garmin G1000 Nxi equipped aircraft, including aircraft manufactured by and/or branded as Cessna, Beechcraft, Embraer, Piper, Cirrus, and Kodiak, as well as the retrofit market, for example. Some embodiments may be applicable to any G1000 installation, regardless of airframe OEM, for example.

The Garmin G1000 Nxi is currently a popular instrument panel for a glass panel platform for a large number of aircraft, and thus, some embodiments of the present disclosure will be described herein as being configured and adapted to fit with a Garmin G1000 Nxi, as an example and illustrative application and use for some embodiments. However, artisans of ordinary skill will recognize that the embodiments described herein may be adapted to any type of display.

Figure 2:
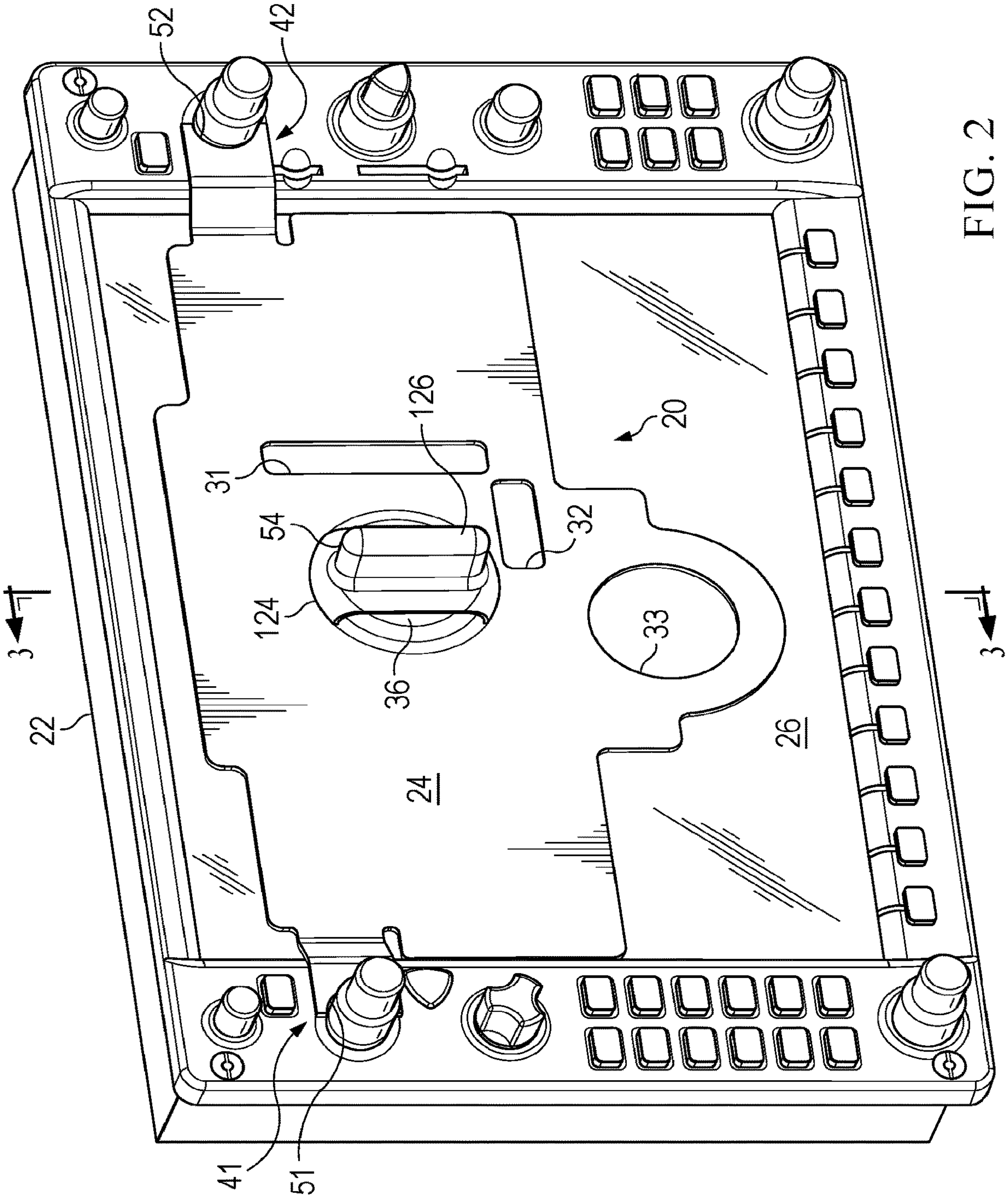
FIG. 2 is a perspective view of a training system installed on an instrument panel, according to some embodiments.
Figure 3:
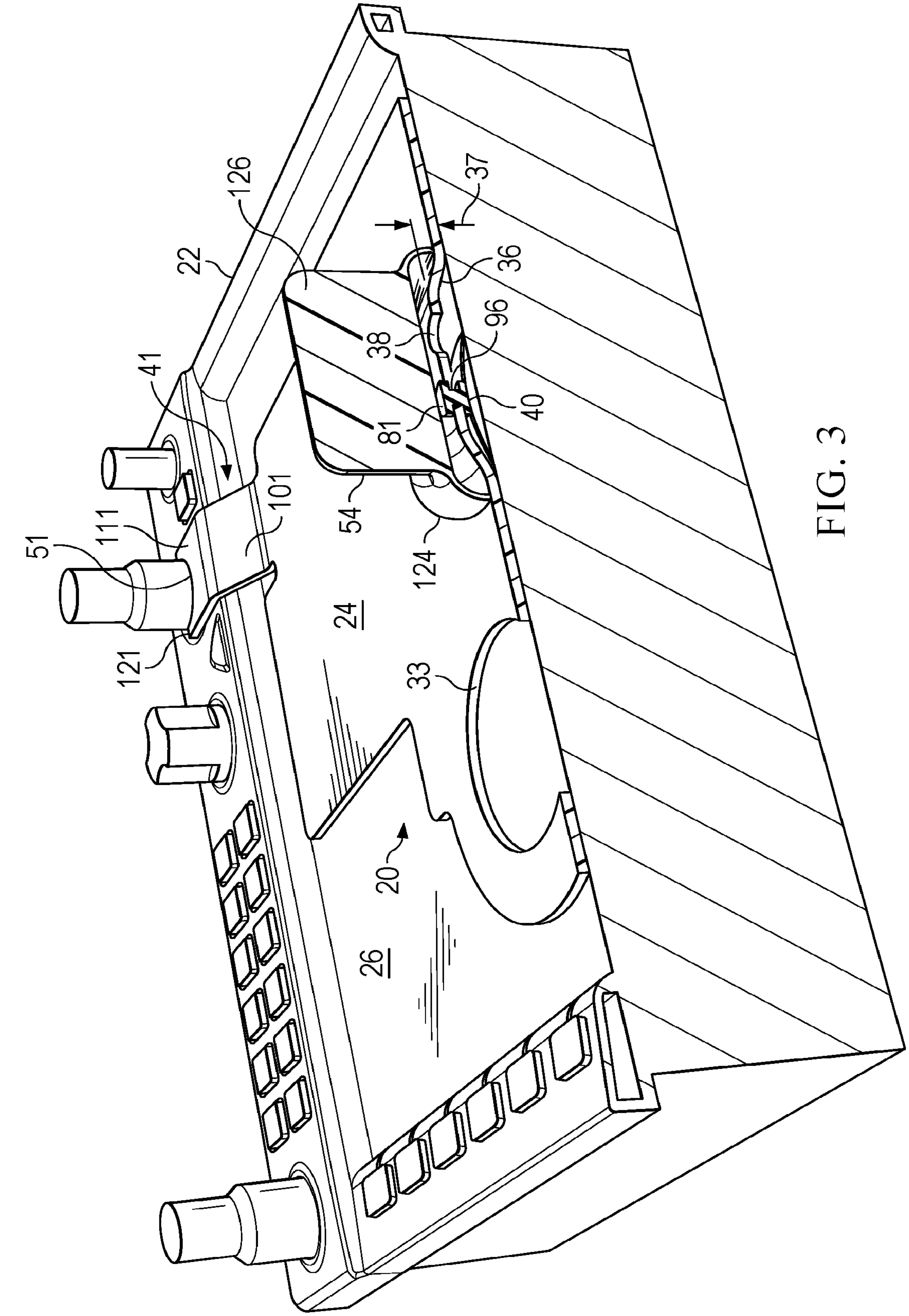
FIG. 3 is a cross-section view of FIG. 2 taken along line 3-3, according to some embodiments.

FIG. 1 is a front view of a flight training system and FIG. 2 is a perspective view of a flight training system, or a training panel cover device 20 installed on a Garmin G1000 Nxi instrument panel 22 according to some embodiments. FIG. 3 is a cross-section view of FIG. 2 taken along line 3-3. FIGS. 4-8 provide additional detailed, cross-section, and enlarged views of the first embodiment of FIGS. 1-3.

In some embodiments, a training system includes a panel cover device 20 and a first suction cup 40. In some embodiments, the panel cover device 20 includes a flat panel region 24 having a first elongated view slot 31, a second view slot 32, and a first circular view hole 33, a first recessed panel region 36 having a first suction cup slot 38, a first side tab 41 having a first notch 51, a second side tab 42 having a second notch 52, and a first handle 54. In some embodiments, the training system may be configured to removably attach the training panel cover device 20 to the instrument panel flight display 26 via the first suction cup 40. In some embodiments, the training system may be configured so that the flat panel region 24 sits flatly and evenly against the instrument panel flight display 26. In some embodiments, the training system may be configured so that the panel cover device 20 is aligned with the instrument panel flight display 26 via the first notch 51 and the second notch 52. In some embodiments, the training system may be configured to conceal a first set of selected information on the instrument panel flight display 26 while revealing a second set of selected information on the instrument panel flight display 26 through the first elongated view slot 31 and the first circular view hole 33 of the panel cover device 20, while revealing a third set of selected information on the instrument panel flight display 26 outside outer boundaries of the flat panel region 24 of the panel cover device 20, and while revealing a fourth set of selected information on the instrument panel flight display 26 through the second view slot 32 of the panel cover device 20. For example, in FIG. 1, the first set of information that is concealed by the training panel cover device 20 may include airspeed, attitude, magnetic heading, and altitude.

Figure 4:
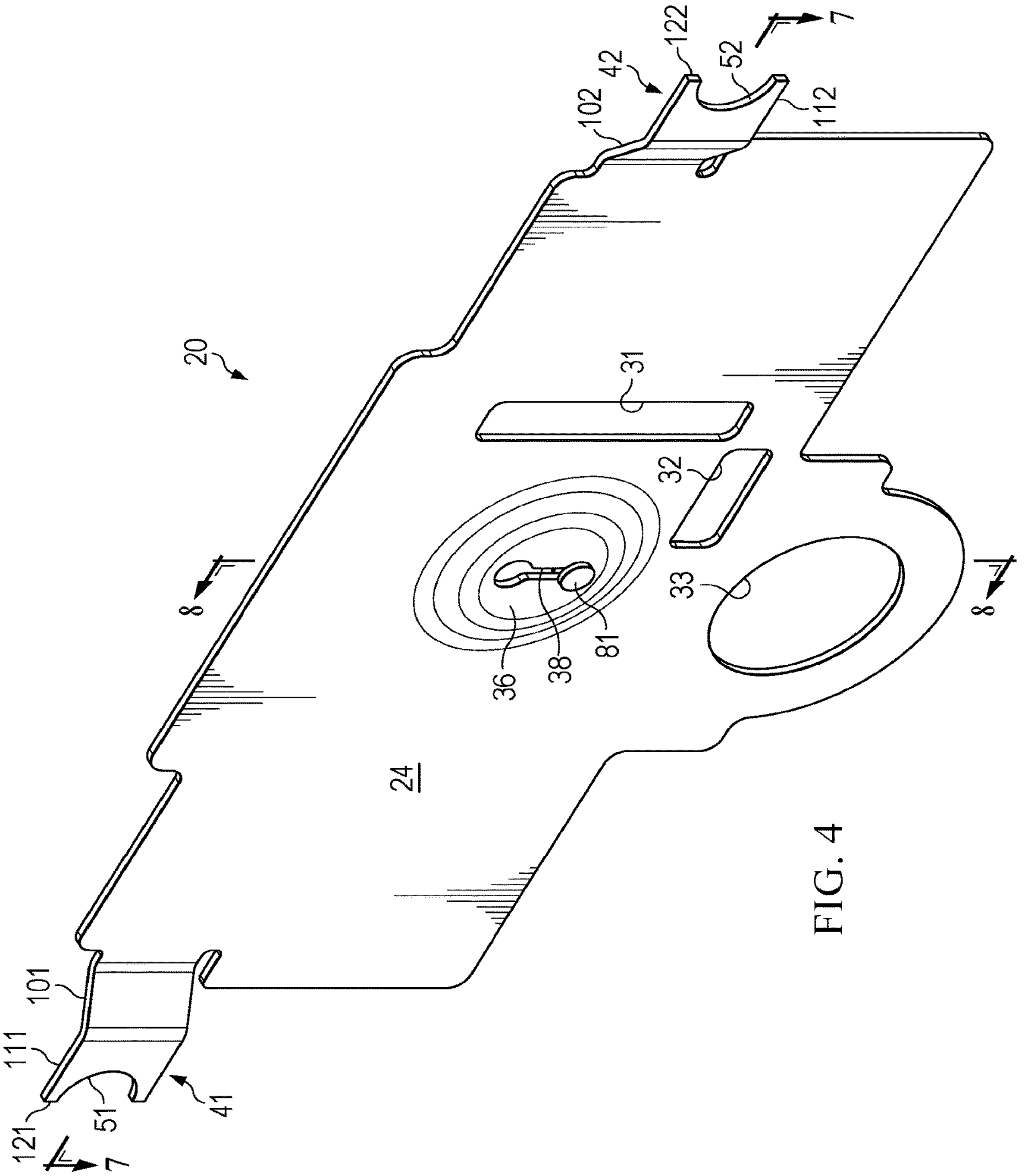
FIG. 4 is a front perspective view of a training system according to some embodiments.
Figure 5:
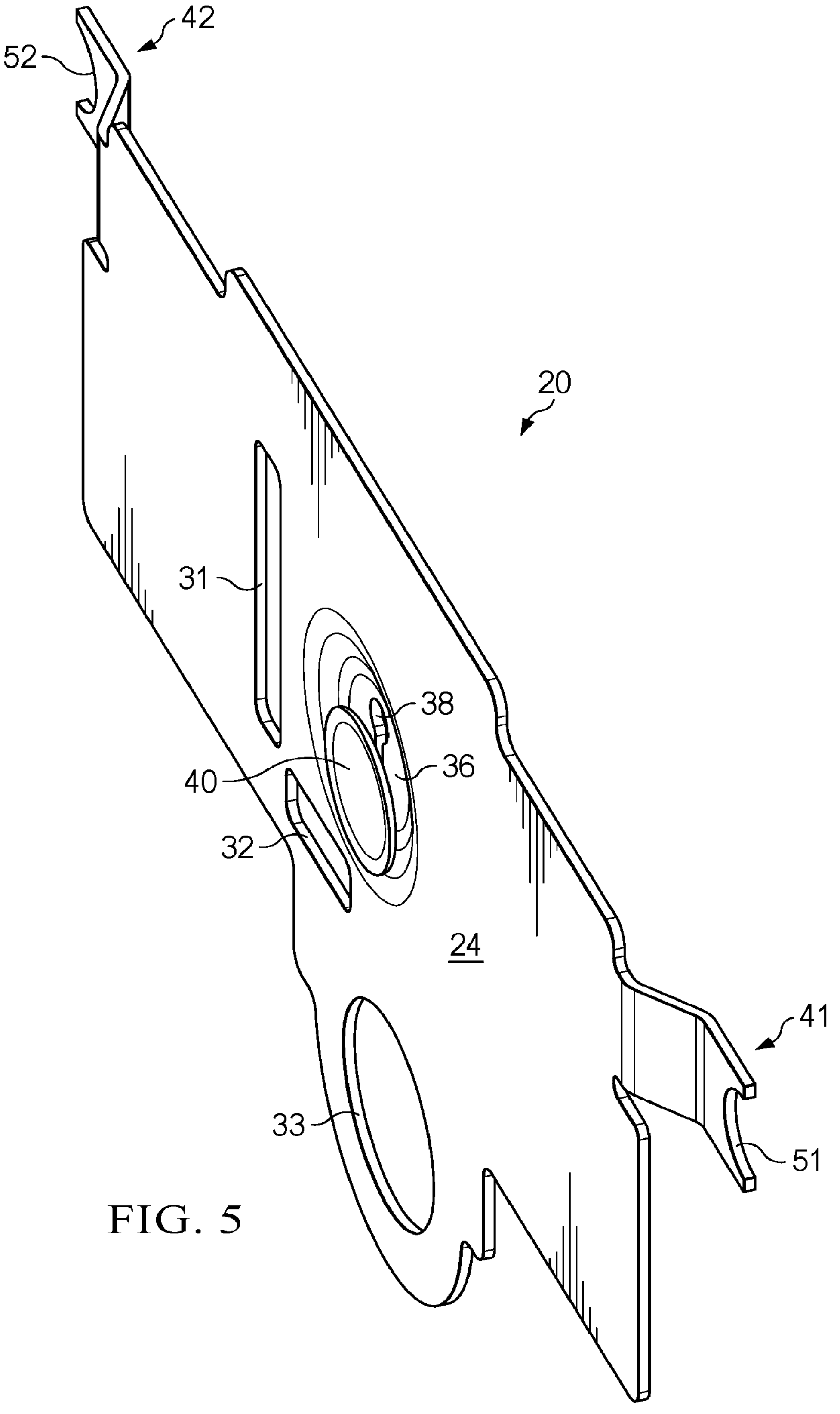
FIG. 5 is a rear perspective view of a training system according to some embodiments.
Figure 6A:
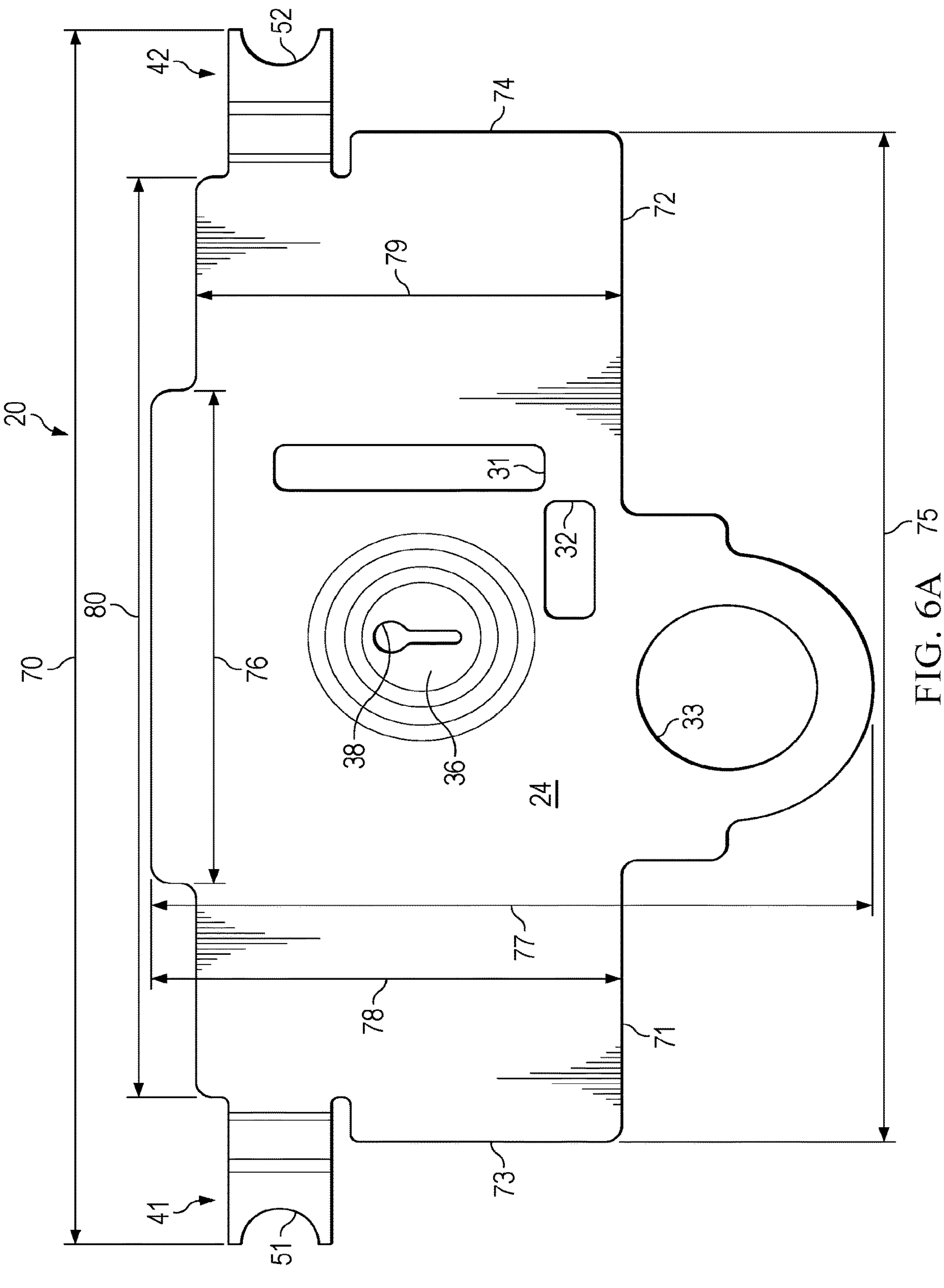
FIG. 6A is a front view of a training panel cover device according to some embodiments.
Figure 6B:
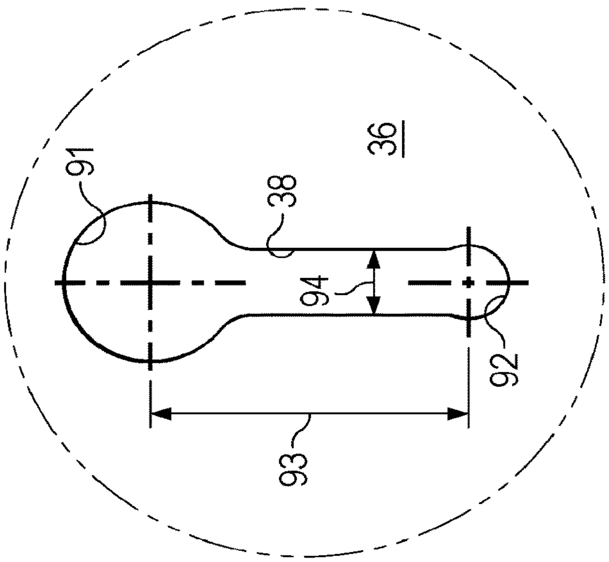
FIG. 6B is an enlarged view of a suction cup slot according to some embodiments.
Figure 7:
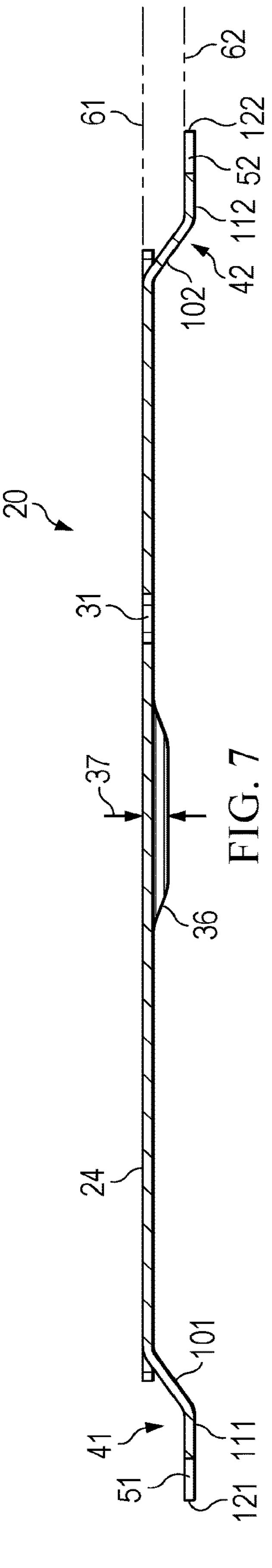
FIG. 7 is a cross-section view of FIG. 4 taken along line 7-7, according to some embodiments.
Figure 8:
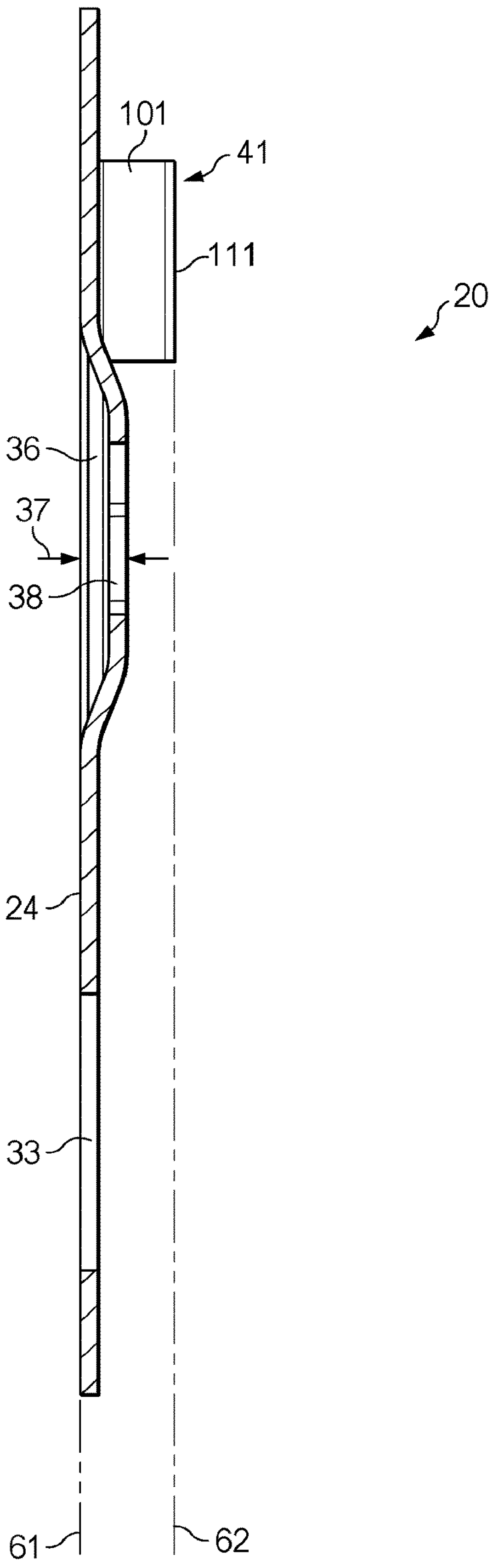
FIG. 8 is a cross-section view of FIG. 4 taken along line 8-8, according to some embodiments.

FIG. 4 is a perspective view of a front side of the training system including the panel cover device 20, according to some embodiments, without the first handle in place to illustrate the placement of the first suction cup 40 in the first suction cup slot 38. FIG. 5 is a perspective view of a back side of the training system including the panel cover device 20, according to some embodiments. FIG. 6A is a front view of the panel cover device 20, according to some embodiments, without the first handle and the first suction cup in place to illustrate the first suction cup slot 38. FIG. 6B is an enlarged view of the first suction cup slot 38 shown in FIG. 6A. FIG. 7 is a cross-section view of the training panel cover device 20 as shown in FIG. 4 taken along line 7-7, and illustrates the first plane 61, the second plane 62, the side tabs 41, 42, and the first recessed panel region 36 for the suction cup placement, according to some embodiments. FIG. 8 is a cross-section view of the training panel cover device 20 as shown in FIG. 4 taken along line 8-8, and illustrates the first plane 61, the second plane 62, the side tabs 41, 42, the first recessed panel region 36 for placement of the first suction cup 40, and the placement of the first suction cup slot 38 in the first recessed panel region 36, according to some embodiments.

In some embodiments, a flat panel region 24 extends along a first plane 61. The flat panel region 24 may have any number of view slots or holes. The flat panel region 24 may have a first elongated view slot 31, a second view slot 32, and a first circular view hole 33 formed therein or therethrough. In some embodiments, the flat panel region 24 sits flat against the instrument panel flight display 26 to conceal or cover a first set of selected information on the instrument panel flight display 26 while revealing a second set of selected information on the instrument panel flight display 26 through the first elongated view slot 31 and the first circular view hole 33, while revealing a third set of selected information on the instrument panel flight display 26 outside outer boundaries of the flat panel region 24, and while revealing a fourth set of selected information on the instrument panel flight display 26 through the second view slot 32, for example. In some embodiments, the second, third, and fourth set of selected information may include glideslope marker, glidepath marker, course deviation indicator, course selection, bearing pointer, bearing pointer data fields, lower bezel soft button functions and fields, flight management system window, traffic map, navigation map, annunciator field, autopilot mode indicator, flight director mode indicator, or the like, or any combination thereof.

In some embodiments, the flat panel region 24 of the training panel cover device 20 has a sheet thickness of about 1.6 mm. In other embodiments, the thickness of the flat panel region 24 may vary, such as being dependent upon the material(s) selected for forming the flat panel region 24. In an embodiment in which the flat panel region 24 is relatively thicker, such as thicker than 2 mm for example, the view slots and holes may have beveled or angled edges rather than perpendicular or straight-cut edges. Such beveled edges may be angled such that a user may see the revealed information on the instrument panel flight display 26 through the view slot or hole from a greater range of view angles relative to the plane of the instrument panel flight display 26. Having a sheet thickness less than about 2 mm at the flat panel region 24, or at the locations of the view slots and holes, may allow for perpendicular or straight-cut edges at the view slots and holes while still enabling a sufficient range of view angles relative to the plane of the instrument panel flight display 26, such as viewing the screen from an adjacent pilot seat in an aircraft, because the sheet thickness is sufficiently thin. Perpendicularly formed or straight-cut edges may be relatively easier and less expensive to manufacture than beveled edges for the view slots and holes.

In some embodiments, the first elongated view slot 31 has a length of 2.1 inches (or about 53 mm) and a width of 0.4 inches (or about 10 mm) with rounded corners. In some embodiments, the second view slot 32 has a length of 1 inch (or about 25 mm) and a width of 0.4 inches (or about 10 mm)

with rounded corners. Although round corners are shown as examples for the first elongated view slot 31 and the second view slot 32, the corners may be square or may have rounded corners of different radii in other embodiments. In the embodiment shown in FIGS. 1-8, the first circular view hole 33 has a diameter of 1.4 inches (or about 36 mm), for example. Although the first view hole is shown as completely circular because the magnetic heading or compass is typically shown in a circular shape, for example, the first circular view hole 33 may be partial circle, oval, elliptical, or arbitrarily shaped in other embodiments.

In some embodiments, the first elongated view slot 31 is an open window slot, the second view slot 32 is an open window slot, and the first circular view hole 33 is an open window hole. In other embodiments, the view slot(s) or view hole(s) may have a clear or transparent covering or insert, such as glass, acrylic, polycarbonate, or thermoplastic material(s), for example. In some embodiments, the panel cover device 20 may be made from a clear or transparent plastic or acrylic material that is painted with an opaque color except at the locations of the first elongated view slot 31, the second view slot 32, and first circular view hole 33 that remain clear or transparent, and in such case, rather than holes. In some embodiments, each of the first elongated view slot 31, the second view slot 32, and the first view hole 33 has a fixed opening size. In other embodiments, the view slot(s) or view hole(s) may have a moveable member that changes the opening size or that may moveably cover the opening to alter the amount of information that may be viewed through the slot(s) or hole(s), for example. For example, a view slot or view hole may have a slidable cover that can cover and uncover the opening of the view slot or view hole. For example, a view slot or view hole may have a foldable or hinged member that can cover and uncover the opening of the view slot or view hole. For example, a view slot or view hole may have a flexible or cloth member that can drape over the view slot or view hole and that can cover and uncover the opening of the view slot or view hole.

A first side 71 of the flat panel region 24 may have a left flat edge 73 and a second side 72 of the flat panel region 24 may have a right flat edge 74. The left flat edge 73 may be separated from the right flat edge 74 by a first panel width 75. In some embodiments, the first panel width 75 is configured to fit a screen width of the instrument panel flight display 26 for a specific make and model of an instrument display panel 22.

In some embodiments, the training panel cover device 20 has a total width 70 of 10.32 inches (or about 262 mm). In some embodiments, the boundary portion of the flat panel region 24 extending partially around the first view hole 33 has a radius 1.125 inches (or about 29 mm). In the embodiment shown in FIGS. 1-8, the flat panel region 24 has a first height 77 of 5.6 inches (or about 142 mm), a second height 78 of 3.65 inches (or about 93 mm), and a third height 79 of 3.3 inches (or about 84 mm), for example. In some embodiments, the flat panel region 24 has a first panel width 75 of 8.58 inch (or about 218 mm), a second width 76 of 7.8 inches (or about 198 mm), and a third width 80 of 4.18 inches (or about 106 mm).

The number, placement and sizes of the view slot(s) and hole(s), the shape and dimensions of the boundary of the flat panel region 24, the first panel width 75, the total width 70, and the number, shape, placement, and dimensions of the side tab regions (if any), for another embodiment may vary depending on information configurations on the instrument panel flight display 26, knob configurations, button configurations, display screen dimensions, and display screen bezel dimensions, of a specific make and model of instrument display panel or depending on the set of information selected to be covered by the training panel cover device 20.

In some embodiments, a first recessed panel region 36 may be formed in the flat panel region 24 and configured to allow the first suction cup 40 to be attached to the instrument panel flight display 26 of an instrument panel 22, to support, or helping to support, the training panel cover device 20, and such that the training panel cover device 20 sits proximate to, or directly on, the instrument panel flight display 26. Thus, the first recessed depth 37 of the first recessed panel region 36 may be configured and adapted for a certain size and configuration of a given suction cup.

In some embodiments, a first recessed panel region 36 is formed in the flat panel region 24 and extends from the first plane 61 toward a second plane 62, with a first recessed depth 37. The second plane 62 may be generally parallel with the first plane 61. In some embodiments, a first suction cup 40 is attached to the first recessed panel region 36. The first suction cup 40 may be partially within the first recessed panel region 36, and partially extend out of the first recessed panel region 36 beyond the first plane 61. In some embodiments, the first recessed panel region 36 does not extend all the way to the second plane 62, such that the first recessed depth 37 is less than a distance between the first plane 61 and the second plane 62. The first suction cup 40 may have a first suction cup thickness in a non-engaged state or relaxed state, and the first recessed depth 37 may be half of or less than half of the first suction cup thickness.

The first suction cup 40 may be attached or retained in the first recessed panel region 36 in a variety of ways or configurations, such as interference fit, snap fit, adhesion, welding, rivet, bolt, screw, hook-and-loop fastener, other fasteners, the like, or combinations thereof, for example. In some embodiments, the first suction cup 40 is retained by a first suction cup slot 38 formed through the first recessed panel region 36. The first suction cup slot 38 may be configured to receive and retain therein a first suction cup end 81 of the first suction cup 40, such that the first suction cup 40 is attached to the first recessed panel region 36 via the first suction cup slot 38. The first suction cup slot 38 may have a first circular region 91 at a first end of the first suction cup slot 38. The first suction cup slot 38 may have a second circular region 92 at a second end of the first suction cup slot 38. The first circular region 91 may be separated from the second circular region 92 by a first spaced distance 93. The second circular region 92 may have a smaller diameter than the first circular region 91. A connecting slot region 94 may extend between the first circular region 91 and the second circular region 92 of the first suction cup slot 38.

The first suction cup end 81 may have a first diameter larger than the second circular region 92 of the first suction cup slot 38, but smaller than the first circular region 91 of the first suction cup slot 38. And the first suction cup end 81 may have a groove 96 formed therein with a second diameter smaller than the first diameter of the first suction cup end 81. The second diameter of the groove 96 in the first suction cup end 81 may be sized and configured to be smaller than, about the same as, or slightly larger than the second circular region 92, so that the first suction cup end 81 fits into the second circular region 92 of the first suction cup slot 38, or so that a deformable material of the first suction cup end 81 may be wedged into the second circular region 92. Also, the connecting slot region 94 of the first suction cup slot 38 may have a width that is less than the second diameter of the groove 96 in the first suction cup end 81, so that a deformable material of the first suction cup end 81 may be squeezed and forced from the first circular region 91 to the second circular region 92, and then relaxed or partially relaxed when entering the second circular region 92, which may retain the first suction cup end 81 in the first suction cup slot 38.

In some embodiments, the first circular region 91 has a diameter of 0.27 inches (or about 6.9 mm), the connecting slot region 94 has a width of 0.11 inch (or about 2.8 mm), and the second circular region 92 has a diameter of 0.13 inch (or about 3.3 mm). In other embodiments, the size, shapes, and configuration of the first suction cup end 81 and the first suction cup slot 38 may vary.

In some embodiments, the training system has a first recessed panel region 36 in the training panel cover device 20, and a first suction cup 40 in first recessed panel region 36, both placed near a center or at a central region of the training panel cover device 20, for example. In some embodiments, one suction cup is sufficient for some applications and uses of the training panel cover device 20, to retain the system during a training exercise. In other embodiments, the number, size, and placement of the recessed region(s), having the suction cup(s) therein, may vary. For example, if it is desired to leave the training panel cover device 20 in place with a stronger force, such as to handle greater vibrations and shaking, or for longer periods of time, then an embodiment may include more than one suction cup. An advantage of a single centrally located suction cup may be greater ease in placing and removing the training panel cover device 20 on an instrument panel flight display 26 because it may have less suction force than multiple suction cups, for example. Another advantage of a single centrally located suction cup may be greater ease in placing and removing the training panel cover device on a display screen because it may easier to position with one hand, for example. For an embodiment without side tabs or without a way of indexing a position, it may be advantageous to have multiple suction cups to prevent the training panel cover device from rotating during use. However, for an embodiment having side tabs 41, 42 for indexing and assisting in stabilizing the position and placement of the training panel cover device 20, and/or assisting in the support of the training panel cover device 20, it may be sufficient to have only one suction cup, for example. The first suction cup 40 may be removeable and replaced because the suction cup functionality may be reduced over time or after repeated heat cycles, such as exposure in a cockpit of an airplane during different seasons, or because the suction cup functionality may be reduced after contact with certain chemicals or oils, or because the suction cup may be worn and torn. It may be anticipated that the life of a suction cup can typically be much less than the life of the remainder of the system or the training panel cover device 20. Thus, it may be an advantage to have a design and configuration enabling quick and easy replacement of the suction cup.

In some embodiments, the training panel cover device 20 includes a first side tab 41 and a second side tab 42. The training panel cover device 20 may be configured to be aligned using or via the first side tab 41 and the second side tab 42. The first side tab 41 and the second side tab 42 may be used to retain or help retain the position of the training panel cover device 20 relative to the instrument panel flight display 26. The first side tab 41 and the second side tab 42 may be used to support or help support the weight of the training panel cover device 20 while the device is fitted to and attached to the instrument panel 22 and/or the instrument panel flight display 26. In some embodiments without a suction cup, the side tabs 41, 42 may be used to index, align, and support the training panel cover device 20 on the instrument panel flight display bezel 22, for example. The first side tab 41 and the second side tab 42 may be offset from the flat panel region 24 to allow for the flat panel region 24 to sit flatly against, rest upon, contact with, or flatly engage with the instrument panel flight display 26.

The first side tab 41 may extend from a first side 71 of the flat panel region 24. The first side tab 41 may have a first side tab transition region 101 and a first side tab notch region 111. The first side tab notch region 111 may have a first notch 51 at a first distal end 121 of the first side tab 41. The first notch 51 may have a semi-circular shape. At least part of the first side tab notch region 111 may be at the second plane 62, such that the first side tab transition region 101 extends between the flat panel region 24 and the first side tab notch region 111. The first side tab transition region 101 may extend and transition from the first plane 61 to the second plane 62. The first side tab notch region 111 may be flat, or planar, and extend along the second plane 62.

The second side tab 42 may extend from a second side 72 of the flat panel region 24. The second side tab 42 may have a second side tab transition region 102 and a second side tab notch region 112. The second side tab notch region 112 may have a second notch 52 at a second distal end 122 of the second side tab 42. The second notch 52 may have a semi-circular shape. At least part of the second side tab notch region 112 may be at the second plane 62, such that the second side tab transition region 102 extends between the flat panel region 24 and the second side tab notch region 112. The second side tab transition region 102 may extend and transition from the first plane 61 to the second plane 62. The second side tab notch region 112 may be flat, or planar, and extend along the second plane 62. In other embodiments, the first side tab notch region 111 and the second side tab notch region 112 may be curved or angled, for example, which may depend on the shape and configuration selected for conforming to or fitting with a given instrument panel.

The first side tab notch region 111 and the second side tab notch region 112 may be offset from the flat panel region 24 to allow for the flat panel region 24 to sit flatly against, rest upon, contact with, or flatly engage with the instrument panel flight display 26. The first notch 51 may be configured to fit at least partially around a first specific knob of a specific make and model of an instrument panel. Also, the second notch 52 may be configured to fit at least partially around a second specific knob of the specific make and model of the instrument panel. For example in FIG. 1, the first notch 51 is fitted to a NAV knob, and the second notch 52 is fitted to a COM knob, on an instrument panel 22 having a model name of G1000 Nxi manufactured by Garmin. In other embodiments, a given tab and/or tab notch may be configured and adapted to be fitted to or engage with a specific knob of a specific make and model of an instrument panel, or with a set of specific knobs of a set of specific makes and models of instrument panels. In some embodiments, the first notch 51 and the second notch 52, each have a fixed size and shape with an open configuration. In other embodiments, a tab may include an adjustable or moveable fastener or mechanism for fitting or engaging with a knob or button of an instrument panel, for example. An advantage of a fixed size and shape may be ease of manufacturing, lower manufacturing cost relative to a mechanism or moveable/adjustable fastener, and lighter weight for the system relative to having a mechanism or moveable/adjustable fastener. A lighter and simpler system may be held in place with less suction force, which may provide an advantage of greater ease in placing and removing the training panel cover device, such as with only one hand, compared to a system having adjustable or movable mechanism(s) or fastener(s) on the tab(s). An advantage of an adjustable or moveable fastener or mechanism on the tab(s) may be a greater diversity of applications for a given configuration of a training panel cover device, or perhaps even a universal or somewhat universal fitting system.

The side tabs 41, 42 and notches 51, 52 may be configured so that the notches are larger than an outside diameter of the specific knobs for which the notches are configured to engage with. In some embodiments, the side tabs 41, 42 and notches 51, 52 may be configured so that there is a clearance gap between the notches and the specific knobs for which the notches are configured to engage with. In some embodiments, the side tabs 41, 42 and notches 51, 52 may be configured so that a width between the two notches is slightly less than a width between the specific knobs for which the notches are configured to engage with, such that the tabs need to be flexed to engage the notches with the knobs and so that the training panel cover device is wedged between the knobs, which may support or help support the training panel cover device against the instrument panel flight display, for example. In such embodiment, the first suction cup 40 and first recessed panel region 36 may be omitted because the training panel cover device may be held in place by the pressure of the flexed side tabs 41, 42 pressing against and engaging the knobs. An advantage of having the side tabs 41, 42 offset relative to the flat panel region 24 may be allowing the flat panel region to sit flatly against the instrument panel flight display 26. Another advantage of having the side tabs 41, 42 offset relative to the flat panel region 24 may be that the first side tab transition region 101 and the second side tab transition region 102 may act as leaf spring or cantilever spring members to enable the tab(s) to flex or bend when there is an interference fit for the notches 51, 52 with the knobs due to a wider width at the notches than the width between the knobs, for example.

For placing the training panel cover device 20 on, and removing the training panel cover device 20 from, an instrument panel flight display 26, it may be helpful and useful to have a handle on the training panel cover device. In some embodiments, a first handle 54 extends between the first plane 61 and the second plane 62, and the first handle 54 extends beyond the second plane 62. In some embodiments, the handle may have a relative shorter height such that the handle does not extend beyond the second plane 62. The first handle 54 may be a separate piece that is permanently or removably attached or fastened to the front side of the training panel cover device 20. The first handle 54 may be attached to a front side of the training panel cover device 20 on, at, about, or proximate to the first recessed panel region 36, for example. The first handle 54 may have a circular attachment point at a first end 124 that mates with or encircles the first recessed panel region 36. The first handle 54 may have a flat elongated portion with grip grooves, adapted or configured for gripping the handle, at a second end 126 of the first handle 54. In some embodiments, one or more handles may be attached to or formed in the flat panel region 24 at any of a wide variety of locations, for example.

In some embodiments, the flat panel region 24, the first side tab 41, the second side tab 42, and the first recessed panel region 36 may be formed from a main piece that is an integral single piece or sheet of material. In some embodiments, components of the training panel cover device 20, singularly or in various combinations thereof, may be formed from an integral single piece of material, or may be formed separately and then permanently or removably attached together. In some embodiments, the main piece, the flat panel region 24, the first side tab 41, the second side tab 42, the first recessed panel region 36, the first handle 54, any combination thereof, and any selection thereof, may be made from any suitable material or alternative materials that can form the shape and configuration of the training panel cover device or device component, as a single integral piece or as a multi-piece component, including but not necessarily limited to: thermoplastic material, thermoplastic acrylic-polyvinyl chloride (e.g., Kydex branded material), acrylonitrile butadiene styrene (ABS), thermoplastic polymer, thermoplastic composites, carbon fiber reinforced polymers (CFRP), forged carbon composite, fiberglass reinforced polymers (FRP), glass fiber reinforced polymer (GFRP), aramid fiber composite, natural fiber composites, metal, metal matrix composite, various castings thereof, various alloys thereof, various composites thereof, various forgings thereof, or combinations thereof, for example.

Figure 9:
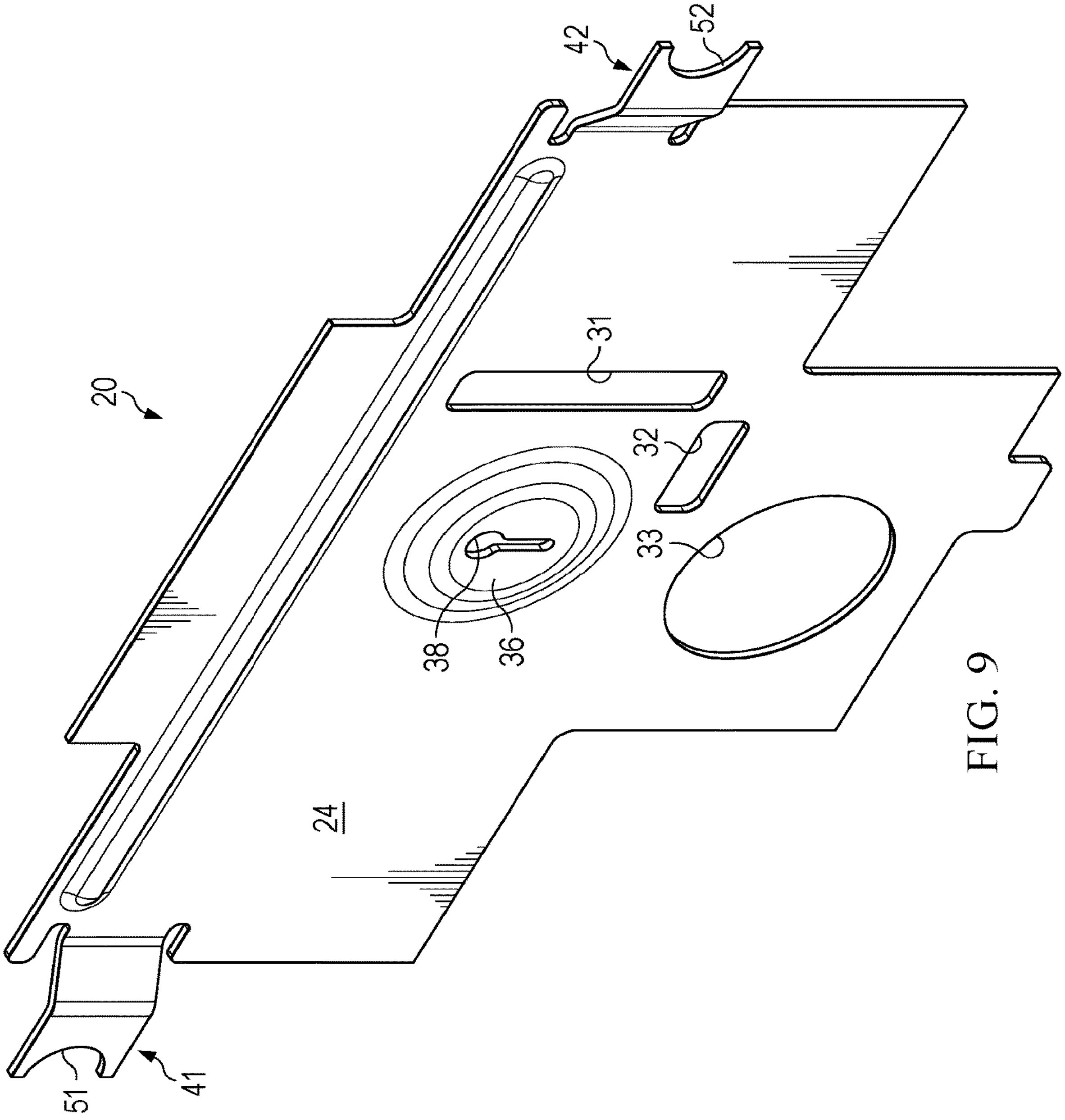
FIG. 9 is a diagram illustrating a front perspective view of a training panel cover device according to some embodiments.

FIG. 9 is a diagram illustrating a front perspective view of a training panel cover device 20 according to some embodiments. The training panel cover device 20 of FIG. 9 has a different shape and configuration for the flat panel region 24, particularly the outer boundaries thereof, compared to the training panel cover device 20 shown in FIGS. 4 and 6A, for example, which may provide covering of more information on the display screen or a different set of information on the instrument panel flight display 26, for example.

Figure 10:
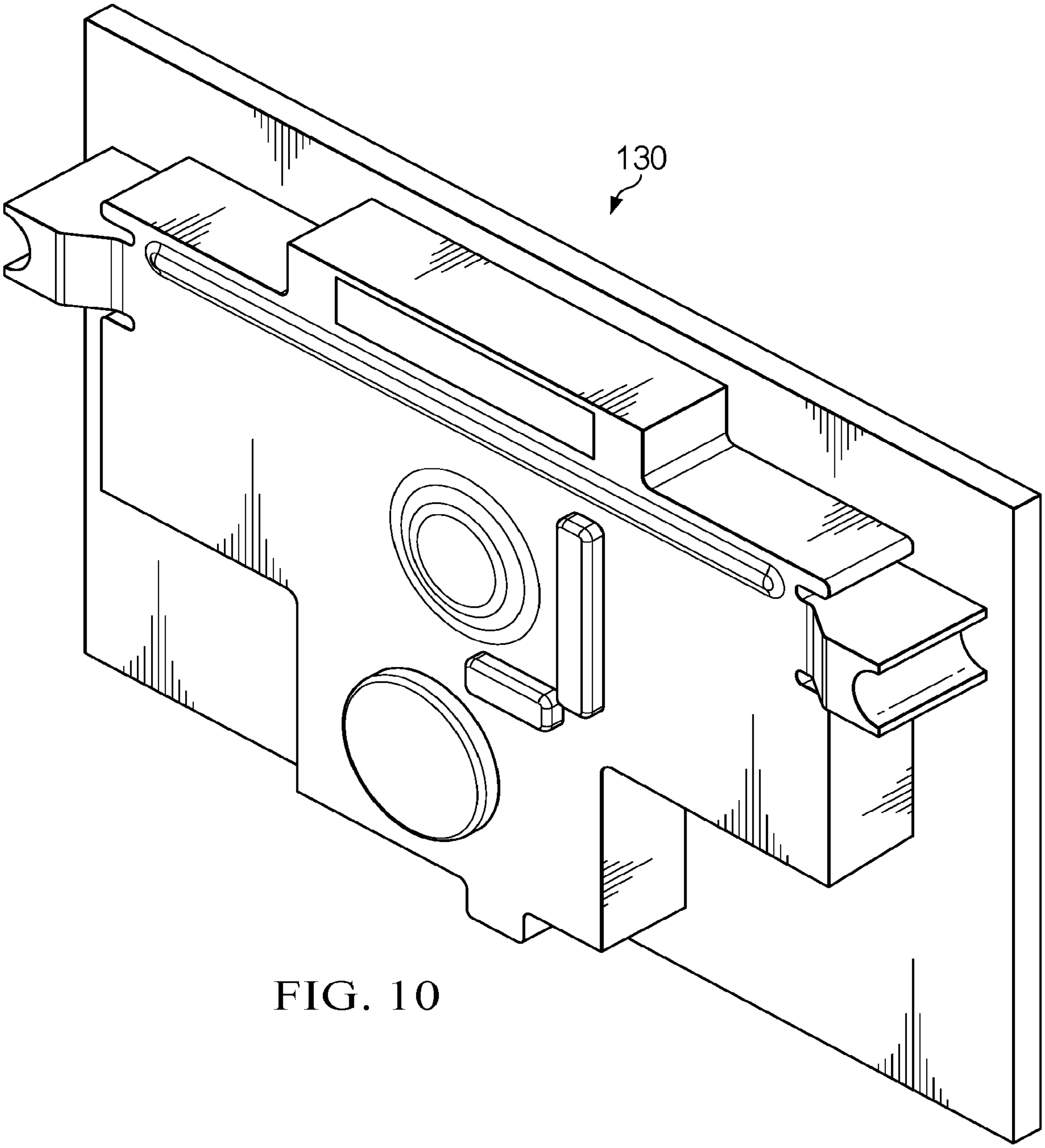
FIG. 10 is a diagram illustrating a front perspective view of a mold for forming a training panel cover device according to some embodiments.
Figure 11:
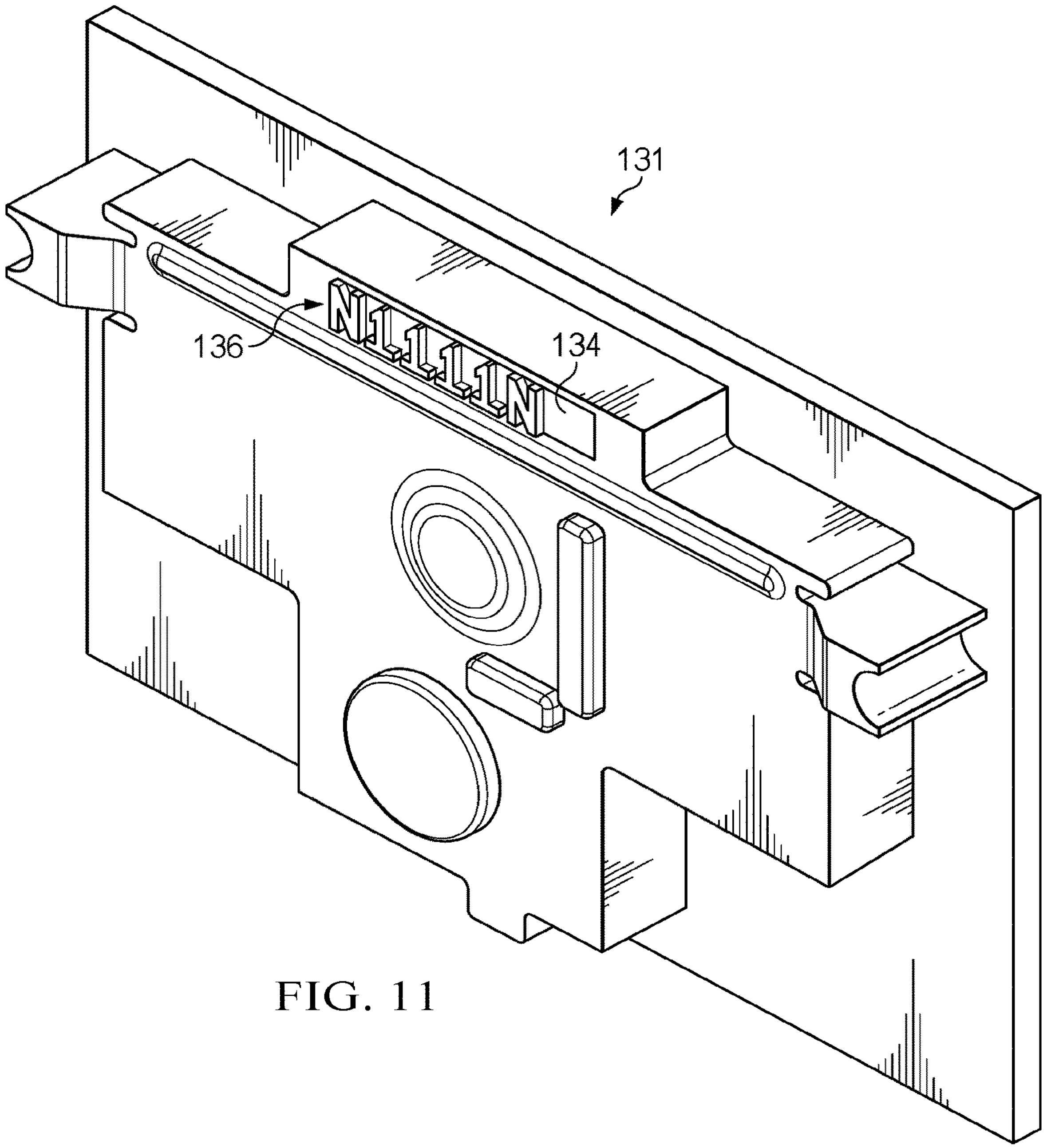
FIG. 11 is a diagram illustrating a front perspective view of a mold for forming a training panel cover device according to some embodiments.
Figure 12:
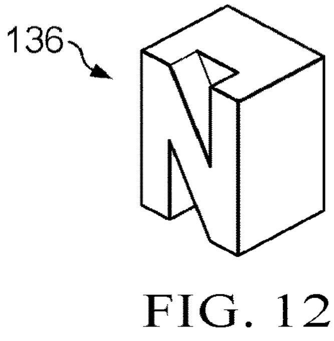
FIG. 12 is a diagram illustrating a front perspective view of a mold for embossing a letter on a training panel cover device according to some embodiments.

FIG. 10 is a diagram illustrating a front perspective view of a mold 130 for forming a training panel cover device according to some embodiments. FIG. 11 is a diagram illustrating a front perspective view of a mold 131 for forming a training panel cover device according to some embodiments. FIG. 12 is a diagram illustrating a front perspective view of a mold for embossing a letter 136 on a training panel cover device 20 according to some embodiments. The mold 131 of FIG. 11 includes a slot 134 in which block numbers and letters 136, such as the example letter 136 shown in FIG. 12, may be inserted. Such block numbers and letters may be used to emboss an identifier, a brand, a name, a message, a warning, or any combination thereof, in the flat panel region 24 or in some other region of a given training panel cover device 20, for example. For example, a training panel cover device 20 may be customized to include a tail number for an aircraft so that the device is associated with a specific aircraft. For example, a training panel cover device 20 may be customized to include a name of a flight instructor or training school.

Figure 13:
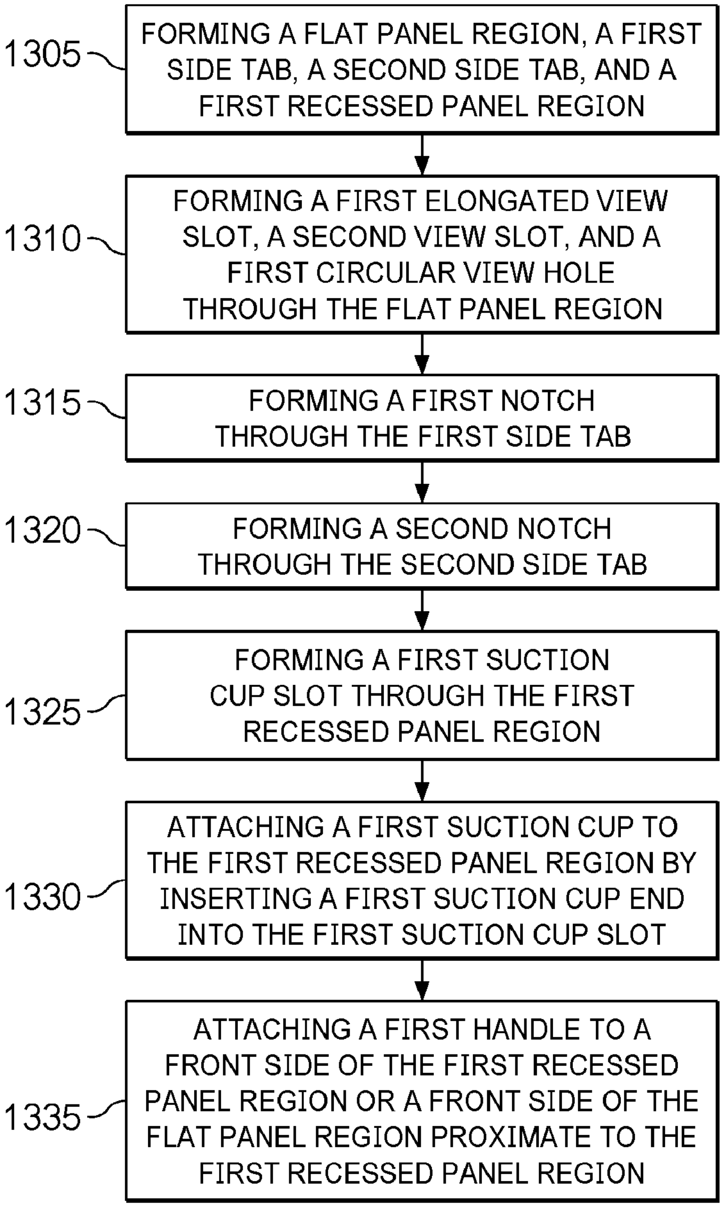
FIG. 13 is a flowchart diagram for illustrating a method of manufacturing a training panel cover device according to some embodiments.

FIG. 13 is a flowchart diagram illustrating for a method of manufacturing a training system including a training panel cover device 20 according to some embodiments. At operation 1305, a flat panel region 24, a first side tab 41, a second side tab 42, and a first recessed panel region 36 may be formed from a single sheet or a single main piece. The forming at operation 1305 may be done using any suitable manufacturing technique, including but not necessarily limited to thermal forming, vacuum forming, pressing, injection molding, stamping, pressure forming, blanking, punching, embossing, bending, deep drawing, hydroforming, stretch forming, superplastic forming, powder metallurgy, laser cutting, water jet cutting, machining, computer numerical controlled machining, hot pressing, or any combination thereof, for example.

At operation 1310, a first elongated view slot 31, a second view slot 32, and a first circular view hole 33 may be formed through the flat panel region 24. The forming at operation 1310 may be performed as a separate step from the operation

1305, or part(s) or all of operation 1310 may be performed simultaneous or overlapping with operation 1305. The forming at operation 1310 may be done by any suitable manufacturing technique, including but not necessarily limited to any of the techniques noted above for operation 1305.

At operation 1315, a first notch 51 may be formed in or through the first side tab 41. At operation 1320, a second notch 52 may be formed in or through the second side tab 42. Operations 1315 and 1320 may be performed together or separately. Operations 1315 and 1320 may be performed as a separate step or separate steps from the operation 1305 and/or operation 1310, or part(s) or all of operations 1315 and 1320 may be performed simultaneous or overlapping with operation 1305 and/or operation 1310. The forming at operations 1315 and 1320 may be done by any suitable manufacturing technique, including but not necessarily limited to any of the techniques noted above for operation 1305.

At operation 1325, a first suction cup slot 38 may be formed through the first recessed panel region 36. Operation 1325 may be performed as a separate step from the operations 1305, 1310, 1315, 1320, or any combination thereof, or operation 1325 may be performed simultaneous or overlapping with operations 1305, 1310, 1315, 1320, or any combination thereof. The forming at operation 1325 may be done by any suitable manufacturing technique, including but not necessarily limited to any of the techniques noted above for operation 1305.

At operation 1330, a first suction cup 40 may be attached to the first recessed panel region 36 by inserting a first suction cup end 81 into the first suction cup slot 38. In some embodiments, the first suction cup 40 may be provided by sourcing, procurement, partial manufacturing of a sourced or procured part, full manufacturing, or some combination thereof, for example. In other embodiments, at operation 1330, a first suction cup 40 may be attached to the first recessed panel region 36 in other ways, such as using interference fit, snap fit, adhesion, welding, rivet, bolt, screw, hook-and-loop fastener, other fasteners, the like, or combinations thereof, for example.

At operation 1335, a first handle 54 may be attached to a front side of the first recessed panel region 36 or a front side of the flat panel region 24 proximate to the first recessed panel region 36, or both. In some embodiments, the first handle 54 may be provided by sourcing, procurement, partial manufacturing of a sourced or procured part, full manufacturing, or some combination thereof, for example. The first handle 54 may be formed by any suitable manufacturing technique, including but not necessarily limited to any of the techniques noted above for operation 1305. In some embodiments, a handle or handles of a training system may be formed simultaneous or overlapping with operations 1305, 1310, 1315, 1320, or any combination thereof, for example.

In some embodiments, the order of the operations may be performed prior to, after, overlapping with, or simultaneous with other operations of the method. According to some embodiments, the operations 1305 to 1335 may be sequentially performed, but are not necessarily sequentially performed. For example, the sequence of the operations may be changed, or at least two operations may be performed in parallel, simultaneously, or overlapping.

In some embodiments, the use of locating tabs, coupled with the use of a suction cup to consistently and accurately allow the installation of a panel cover device on an instrument display, may provide many advantages. In some embodiments, the tabs themselves, may allow for a smoother, faster installation of the panel cover device, as there may be no requirement to install the panel cover device over the COM and NAV tuning knobs on the G1000 display panel, for example. In some embodiments, the use of a suction cup to affix the cover device to a flight display screen may prevent the cover device from rotating, moving, or falling under its own weight, which may result in a parallax interference between the cover device and the flight display screen, and which may render some data unreadable by either the pilot or flight instructor that was intended to be readable. Additionally, in some embodiments, the suction cup may prevent the panel cover device from being jostled by turbulence or normal maneuvering.

In some embodiments, left and right hand locating tabs may be shaped to match the diameter of COM and NAV outer tuning knobs of a model G1000 or G1000 Nxi flight display manufactured by Garmin. In some embodiments, the tabs may join the aft face of the panel cover device and then may be offset to allow the cover device to sit more closely to the instrument panel flight display while matching the offset of the mounting suction cup. In some embodiments, a centrally located vertical hand hold tab or handle may be incorporated to facilitate installation and removal of the panel cover device.

In some embodiments, below and in line with the hand hold tab or handle, a suction cup may be installed via a keyed groove or slot molded or cut into the cover device. In some embodiments, the suction-cup-retaining groove or slot itself may be recessed from the forward facing face of the cover device to minimize parallax to the display when viewed from the pilots seating positions. In some embodiments, the panel cover device may be contoured in its shape and may contain cutouts such that the information hidden by the panel cover device is that which would be lost during a failure of the ADC/AHRS unit.

In some embodiments, the CDI and Glideslope/Glidepath windows may be cut into the panel cover device and may be beveled such that visual interference between the panel cover device and the PFD displayed may be minimized when viewed from the right seat pilot, such as when the seat is positioned in a typical location for flight instruction purposes.

A molded or 3D printed cover for an avionics display, forming a device according to some embodiments of the present disclosure, may simulate a failure of the ADC/AHRS avionics unit. In some embodiments, the cover device may include a flat sheet of plastic molded to preserve information and data fields unaffected by an ADC/AHRS failure, while simultaneously blocking data that would be removed in that failure scenario. In some embodiments, the molded cutouts may be beveled and recessed from the aft surface of the cover to reduce parallax and obscuration of the remaining data for viewing by a flight instructor in the right seat of the aircraft, for example. In some embodiments, the panel cover device may be mounted to the display screen via a centrally located suction cup and may be positioned by two locating tabs that index to the outer COM and NAV tuning knobs, for example. In some embodiments, a centrally located, aft facing finger tab or handle may be molded to the design to allow easy manipulation of the cover by the pilot or by a flight instructor.

Although example embodiments of a training panel cover device configured and adapted for a specific instrument panel for an aircraft are discussed herein, some embodiments may be configured and adapted to be used for other instrument panels and for other applications, uses, and industries, as may be apparent to one of ordinary skill in the art to which the present disclosure pertains, such as other aircraft, spacecraft, trains, boats, construction equipment, commercial equipment, industrial equipment, electric vehicles, automobiles, and consumer products, for example.

A training system embodiment includes a panel cover device and a first suction cup. In the embodiment, the panel cover device has a first panel region and a first recessed panel region. In the embodiment, the first panel region extends along a first plane, where the first panel region has a first elongated view slot therein and a first circular view hole therein. In the embodiment, the first recessed panel region extends from the first plane toward a second plane, where the first recessed panel region has a first recessed depth, and where the second plane is generally parallel with the first plane. In the embodiment, the first suction cup is attached to the first recessed panel region. In the embodiment, the first suction cup is partially within the first recessed panel region, and the first suction cup partially extends out of the first recessed panel region toward and beyond the first plane.

In some embodiments, the panel cover device has a first side tab extending from a first side of the first panel region, the first side tab includes a first side tab transition region and a first side tab notch region, the first side tab notch region includes a first notch at a first distal end of the first side tab, at least part of the first side tab notch region is at the second plane, the first side tab transition region extending between the first panel region and the first side tab notch region, and the first side tab transition region extending and transitioning from the first plane to the second plane. In some embodiments, the panel cover device has a second side tab extending from a second side of the first panel region, the second side tab includes a second side tab transition region and a second side tab notch region, the second side tab notch region includes a second notch at a second distal end of the second side tab, at least part of the second side tab notch region is at the second plane, the second side tab transition region extending between the first panel region and the second side tab notch region, and the second side tab transition region extending and transitioning from the first plane to the second plane.

In some embodiments, the system further includes a first handle extending from the first plane toward the second plane, where the first handle extends beyond the second plane.

In some embodiments, the first panel region, the first side tab, the second side tab, and the first recessed panel region are a single integral part of the panel cover device. In some embodiments, the first panel region is a flat panel region. In some embodiments, the first suction cup and the first handle are separate components attached to the panel cover device. In some embodiments, at least part of the first recessed panel region is located outside of the first plane, and where the first recessed depth is less than a distance between the first plane and the second plane. In some embodiments, the first elongated view slot is an open window slot. In some embodiments, the first circular view hole is an open window hole. In some embodiments, the first handle is attached to a front side of the first recessed panel region.

In some embodiments, the panel cover device is configured to removably attach to an instrument panel flight display via the first suction cup. In some embodiments, each of the first notch and the second notch has a semi-circular shape. In some embodiments, the panel cover device is configured to be aligned via the first notch and the second notch such that the first panel region sits against the instrument panel flight display to obscure a first set of selected information on the instrument panel flight display while revealing a second set of selected information on the instrument panel flight display through the first elongated view slot and the first circular view hole, and while revealing a third set of selected information on the instrument panel flight display outside outer boundaries of the first panel region. In some embodiments, the first side tab notch region extends along the second plane. In some embodiments, the second side tab notch region extends along the second plane. In some embodiments, the first panel region further comprises a second view slot formed therein, the second view slot is configured to reveal a fourth set of selected information on the instrument panel flight display through the second view slot. In some embodiments, the first elongated view slot has a first fixed opening size. In some embodiments, the second view slot has a second fixed opening size. In some embodiments, the first circular view hole has a third fixed opening size. In some embodiments, the first set of selected information comprises one of or any combination of airspeed, altitude, vertical speed indicator, magnetic heading, attitude, altitude pre-selector, and heading bug. In some embodiments, the second and third sets of selected information comprise one of or any combination of glideslope marker, glidepath marker, course deviation indicator, course selection, bearing pointer, bearing pointer data fields, lower bezel soft button functions and fields, flight management system window, traffic map, navigation map, annunciator field, autopilot mode indicator, and flight director mode indicator.

In some embodiments, a first side of the first panel region comprises a left flat edge and a second side of the first panel region comprises a right flat edge, where the left flat edge is separated from the right flat edge by a first panel width, the first panel width is configured to fit a screen width of an instrument panel flight display.

In some embodiments, the first suction cup has a first suction cup thickness in a non-engaged state, and where the first recessed depth is half of or less than half of the first suction cup thickness.

In some embodiments, the first recessed panel region comprises a first suction cup slot therethrough, the first suction cup slot is configured to receive and retain the first suction cup therein, and where the first suction cup is attached to the first recessed panel region via the first suction cup slot.

In some embodiments, the first suction cup slot comprises a first circular region at a first end of the first suction cup slot and a second circular region at a second end of the first suction cup slot, where the first circular region is separated from the second circular region by a first spaced distance, and where the second circular region has a smaller diameter than the first circular region.

A flight training system embodiment includes a panel cover device. In the embodiment, the panel cover device has a first panel region, a first side tab, a second side tab, and a first recessed panel region, where the first panel region extends along a first plane, where the first panel region has a first elongated view slot therein and a first circular view hole therein, where the first side tab extends from a first side of the first panel region, where the first side tab has a first side tab transition region and a first side tab notch region, where the first side tab notch region has a first notch at a first distal end of the first side tab, where at least part of the first side tab notch region is at a second plane, where the second plane is parallel with the first plane, where the first side tab transition region extends between the first panel region and the first side tab notch region, where the first side tab transition region extends and transitions from the first plane to the second plane, where the second side tab extends from a second side of the first panel region, where the second side tab has a second side tab transition region and a second side tab notch region, where the second side tab notch region has a second notch at a second distal end of the second side tab, where at least part of the second side tab notch region is at the second plane, where the second side tab transition region extends between the first panel region and the second side tab notch region, where the second side tab transition region extends and transitions from the first plane to the second plane, where the first recessed panel region extends from the first plane toward the second plane and has a first recessed depth, where a first suction cup attached to the first recessed panel region, where the first suction cup is partially within the first recessed panel region, where the first suction cup partially extends out of the first recessed panel region beyond the first plane, where a first handle extends from the first plane toward the second plane, and where the first handle extends beyond the second plane.

In some embodiments, the panel cover device is configured to removably attach to an instrument panel flight display in an aircraft for simulating instrument failure during flight by obscuring a first set of information on the instrument panel flight display. In some embodiments, the panel cover device is configured to removably attach to the instrument panel flight display via the first suction cup. In some embodiments, the panel cover device is configured to be aligned on the instrument panel flight display via the first notch and the second notch such that the first panel region sits against the instrument panel flight display to obscure the first set of selected information on the instrument panel flight display while revealing a second set of selected information on the instrument panel flight display through the first elongated view slot and the first circular view hole, and while revealing a third set of selected information on the instrument panel flight display outside outer boundaries of the first panel region.

In some embodiments, the first handle is attached to a front side of the first recessed panel region. In some embodiments, the first panel region, the first side tab, the second side tab, and the first recessed panel region are a single integral part. In some embodiments, the first panel region is a flat panel region. In some embodiments, the first suction cup and the first handle are separate components attached to the panel cover device. In some embodiments, each of the first notch and the second notch has a semi-circular shape. In some embodiments, the first suction cup has a first suction cup thickness in a non-engaged state. In some embodiments, the first recessed depth is half of or less than half of the first suction cup thickness. In some embodiments, the first recessed panel region comprises a first suction cup slot therethrough, the first suction cup slot includes a first circular region at a first end of the first suction cup slot and a second circular region at a second end of the first suction cup slot, where the first circular region is separated from the second circular region by a first spaced distance, and where the second circular region has a smaller diameter than the first circular region. In some embodiments, the first notch is configured to fit at least partially around a first knob of an instrument panel, and where the second notch is configured to fit at least partially around a second knob of the instrument panel. In some embodiments, the first side tab notch region extends along the second plane. In some embodiments, the second side tab notch region extends along the second plane. In some embodiments, the first panel region further comprises a second view slot therein, the second view slot is configured to reveal a fourth set of selected information on the instrument panel flight display through the second view slot. In some embodiments, the first elongated view slot has a first fixed opening size. In some embodiments, the second view slot has a second fixed opening size. In some embodiments, the first circular view hole has a third fixed opening size. In some embodiments, the first side of the first panel region comprises a left flat edge and the second side of the first panel region comprises a right flat edge, where the left flat edge is separated from the right flat edge by a first panel width, the first panel width is configured to fit a screen width of the instrument panel flight display for the instrument panel. In some embodiments, the first set of selected information comprises any combination of airspeed, altitude, vertical speed indicator, magnetic heading, attitude, altitude pre-selector, and heading bug. In some embodiments, the second, third, and fourth sets of selected information comprise any combination of glideslope marker, glidepath marker, course deviation indicator, course selection, bearing pointer, bearing pointer data fields, lower bezel soft button functions and fields, flight management system window, traffic map, navigation map, annunciator field, autopilot mode indicator, and flight director mode indicator.

A method embodiment of manufacturing a training system includes forming panel cover device that has a first panel region, a first elongated view slot, a first circular view hole, a first side tab, a first notch, a second side tab, a second notch, and a first recessed panel region, as an integral piece, where the first elongated view slot is formed through the first panel region, where the first circular view hole is formed through the first panel region, where the first side tab extends from a first side of the first panel region, where the first side tab includes a first side tab transition region and a first side tab notch region, where the first side tab notch region includes the first notch formed therethrough at a first distal end of the first side tab, where the first panel region extends along a first plane, where at least part of the first side tab notch region is at a second plane, where the second plane is generally parallel with the first plane, where the first side tab transition region extends between the first panel region and the first side tab notch region, where the first side tab transition region extends and transitions from the first plane to the second plane, where the second side tab extends from a second side of the first panel region, where the second side tab includes a second side tab transition region and a second side tab notch region, where the second side tab notch region includes the second notch formed therethrough at a second distal end of the second side tab, where at least part of the second side tab notch region is at the second plane, where the second side tab transition region extends between the first panel region and the second side tab notch region, where the second side tab transition region extends and transitions from the first plane to the second plane, and where the first recessed panel region extends from the first plane toward the second plane and has a first recessed depth, and attaching a first suction cup to the first recessed panel region, such that the first suction cup is partially within the first recessed panel region and partially extending out of the first recessed panel region beyond the first plane.

In some embodiments, the method further includes attaching a first handle to a front side of the panel cover device.

In some embodiments, the forming on the panel cover device further comprises forming a first suction cup slot through the first recessed panel region, where the first suction cup slot has a first circular region at a first end of the first suction cup slot, where the first suction cup slot has a second circular region at a second end of the first suction cup slot, where the first circular region is separated from the second circular region by a first spaced distance, and where the second circular region has a smaller diameter than the first circular region, and where the attaching the first suction cup to the first recessed panel region comprises inserting a first suction cup end of the first suction cup into the first suction cup slot.

In some embodiments, each of the first notch and the second notch has a semi-circular shape, where the first panel region has a flat planar shape, where the first notch is configured to fit at least partially around a first knob of an instrument panel, and where the second notch is configured to fit at least partially around a second knob of the instrument panel, where the panel cover device is configured to removably attach to a display screen of the instrument panel via the first suction cup, and where the panel cover device is configured to be aligned with the display screen via the first notch and the second notch such that the first panel region sits against the display screen to obscure a first set of selected information on the display screen while revealing a second set of selected information on the display screen through the first elongated view slot and the first circular view hole, and while revealing a third set of selected information on the display screen outside outer boundaries of the first panel region.

In some embodiments, the forming on the panel cover device further comprises forming a second view slot through the first panel region.

In some embodiments, the forming on the panel cover device comprises thermoforming.

In some embodiments, the forming on the panel cover device comprises stamping.

In some embodiments, the forming on the panel cover device comprises injection molding.

While illustrative and example embodiments have been described with reference to illustrative drawings, this description is not intended to be construed in a limiting sense. Various modifications and combinations of the illustrative and example embodiments, as well as other embodiments, may be apparent to persons skilled in the pertinent art upon referencing the present disclosure. It is therefore intended that the appended claims encompass any and all of such modifications, equivalents, or embodiments.

What is claimed is:

1. A training system comprising:

a panel cover device having a first panel region and a first recessed panel region, wherein the first panel region extends along a first plane, wherein the first panel region has a first elongated view slot therein and a first circular view hole therein, wherein the first recessed panel region extends from the first plane toward a second plane, wherein the first recessed panel region has a first recessed depth, and wherein the second plane is parallel with the first plane; and a first suction cup attached to the first recessed panel region, the first suction cup being partially within the first recessed panel region, and the first suction cup partially extending out of the first recessed panel region toward and beyond the first plane;

wherein the panel cover device has a first side tab extending from a first side of the first panel region, the first side tab comprising a first side tab transition region and a first side tab notch region, the first side tab notch region comprising a first notch at a first distal end of the first side tab, at least part of the first side tab notch region being at the second plane, the first side tab transition region extending between the first panel region and the first side tab notch region, and the first side tab transition region extending and transitioning from the first plane to the second plane, and wherein the panel cover device has a second side tab extending from a second side of the first panel region, the second side tab comprising a second side tab transition region and a second side tab notch region, the second side tab notch region comprising a second notch at a second distal end of the second side tab, at least part of the second side tab notch region being at the second plane, the second side tab transition region extending between the first panel region and the second side tab notch region, and the second side tab transition region extending and transitioning from the first plane to the second plane.

2. The system of claim 1, further comprising a first handle extending from the first plane toward the second plane, and wherein the first handle extends beyond the second plane.

3. The system of claim 2, wherein the first panel region, the first side tab, the second side tab, and the first recessed panel region are a single integral part of the panel cover device, wherein the first panel region is a flat panel region, wherein the first suction cup and the first handle are separate components attached to the panel cover device, wherein at least part of the first recessed panel region is located outside of the first plane, and wherein the first recessed depth is less than a distance between the first plane and the second plane, wherein the first elongated view slot is an open window slot, wherein the first circular view hole is an open window hole, and wherein the first handle is attached to a front side of the first recessed panel region.

4. The system of claim 1, wherein the panel cover device is configured to removably attach to an instrument panel flight display via the first suction cup, wherein each of the first notch and the second notch has a semi-circular shape, wherein the panel cover device is configured to be aligned via the first notch and the second notch such that the first panel region sits against the instrument panel flight display to obscure a first set of selected information on the instrument panel flight display while revealing a second set of selected information on the instrument panel flight display through the first elongated view slot and the first circular view hole, and while revealing a third set of selected information on the instrument panel flight display outside outer boundaries of the first panel region, wherein the first side tab notch region extends along the second plane, wherein the second side tab notch region extends along the second plane, wherein the first panel region further comprises a second view slot formed therein, the second view slot being configured to reveal a fourth set of selected information on the instrument panel flight display through the second view slot, wherein the first elongated view slot has a first fixed opening size, wherein the second view slot has a second fixed opening size, wherein the first circular view hole has a third fixed opening size, wherein the first set of selected information comprises one of or any combination of airspeed, altitude, vertical speed indicator, magnetic heading, attitude, altitude pre-selector, and heading bug, and wherein the second and third sets of selected information comprise one of or any combination of glideslope marker, glidepath marker, course deviation indicator, course selection, bearing pointer, bearing pointer data fields, lower bezel soft button functions and fields, flight management system window, traffic map, navigation map, annunciator field, autopilot mode indicator, and flight director mode indicator.

5. The system of claim 1, wherein a first side of the first panel region comprises a left flat edge and a second side of the first panel region comprises a right flat edge, wherein the left flat edge is separated from the right flat edge by a first panel width, the first panel width being configured to fit a screen width of an instrument panel flight display.

6. The system of claim 1, wherein the first suction cup has a first suction cup thickness in a non-engaged state, and wherein the first recessed depth is half of or less than half of the first suction cup thickness.

7. The system of claim 1, wherein the first recessed panel region comprises a first suction cup slot therethrough, the first suction cup slot being configured to receive and retain the first suction cup therein, and wherein the first suction cup is attached to the first recessed panel region via the first suction cup slot.

8. The system of claim 7, wherein the first suction cup slot comprises a first circular region at a first end of the first suction cup slot and a second circular region at a second end of the first suction cup slot, wherein the first circular region is separated from the second circular region by a first spaced distance, and wherein the second circular region has a smaller diameter than the first circular region.

9. A flight training system, comprising:

a panel cover device having a first panel region, a first side tab, a second side tab, and a first recessed panel region, wherein the first panel region extends along a first plane, wherein the first panel region has a first elongated view slot therein and a first circular view hole therein, wherein the first side tab extends from a first side of the first panel region, wherein the first side tab has a first side tab transition region and a first side tab notch region, wherein the first side tab notch region has a first notch at a first distal end of the first side tab, at least part of the first side tab notch region being at a second plane, the second plane being parallel with the first plane, wherein the first side tab transition region extends between the first panel region and the first side tab notch region, wherein the first side tab transition region extends and transitions from the first plane to the second plane, wherein the second side tab extends from a second side of the first panel region, wherein the second side tab has a second side tab transition region and a second side tab notch region, wherein the second side tab notch region has a second notch at a second distal end of the second side tab, at least part of the second side tab notch region being at the second plane, wherein the second side tab transition region extends between the first panel region and the second side tab notch region, wherein the second side tab transition region extends and transitions from the first plane to the second plane, wherein the first recessed panel region extends from the first plane toward the second plane and has a first recessed depth;

a first suction cup attached to the first recessed panel region, the first suction cup being partially within the first recessed panel region, and the first suction cup partially extending out of the first recessed panel region beyond the first plane; and a first handle extending from the first plane toward the second plane, and wherein the first handle extends beyond the second plane.

10. The system of claim 9, wherein the panel cover device is configured to removably attach to an instrument panel flight display in an aircraft for simulating instrument failure during flight by obscuring a first set of information on the instrument panel flight display, wherein the panel cover device is configured to removably attach to the instrument panel flight display via the first suction cup, wherein the panel cover device is configured to be aligned on the instrument panel flight display via the first notch and the second notch such that the first panel region sits against the instrument panel flight display to obscure the first set of selected information on the instrument panel flight display while revealing a second set of selected information on the instrument panel flight display through the first elongated view slot and the first circular view hole, and while revealing a third set of selected information on the instrument panel flight display outside outer boundaries of the first panel region.

11. The system of claim 10, wherein the first handle is attached to a front side of the first recessed panel region, wherein the first panel region, the first side tab, the second side tab, and the first recessed panel region are a single integral part, wherein the first panel region is a flat panel region, wherein the first suction cup and the first handle are separate components attached to the panel cover device, wherein each of the first notch and the second notch has a semi-circular shape, wherein the first suction cup has a first suction cup thickness in a non-engaged state, wherein the first recessed depth is half of or less than half of the first suction cup thickness, wherein the first recessed panel region comprises a first suction cup slot therethrough, the first suction cup slot comprising a first circular region at a first end of the first suction cup slot and a second circular region at a second end of the first suction cup slot, wherein the first circular region is separated from the second circular region by a first spaced distance, and wherein the second circular region has a smaller diameter than the first circular region, wherein the first notch is configured to fit at least partially around a first knob of an instrument panel, and wherein the second notch is configured to fit at least partially around a second knob of the instrument panel, wherein the first side tab notch region extends along the second plane, wherein the second side tab notch region extends along the second plane, wherein the first panel region further comprises a second view slot therein, the second view slot being configured to reveal a fourth set of selected information on the instrument panel flight display through the second view slot, wherein the first elongated view slot has a first fixed opening size, wherein the second view slot has a second fixed opening size, wherein the first circular view hole has a third fixed opening size, wherein the first side of the first panel region comprises a left flat edge and the second side of the first panel region comprises a right flat edge, wherein the left flat edge is separated from the right flat edge by a first panel width, the first panel width being configured to fit a screen width of the instrument panel flight display for the instrument panel, wherein the first set of selected information comprises any combination of airspeed, altitude, vertical speed indicator, magnetic heading, attitude, altitude pre-selector, and heading bug, and wherein the second, third, and fourth sets of selected information comprise any combination of glideslope marker, glidepath marker, course deviation indicator, course selection, bearing pointer, bearing pointer data fields, lower bezel soft button functions and fields, flight management system window, traffic map, navigation map, annunciator field, autopilot mode indicator, and flight director mode indicator.

12. A method of manufacturing a training system, comprising:

forming panel cover device having a first panel region, a first elongated view slot, a first circular view hole, a first side tab, a first notch, a second side tab, a second notch, and a first recessed panel region, as an integral piece, wherein the first elongated view slot is formed through the first panel region, wherein the first circular view hole is formed through the first panel region, wherein the first side tab extends from a first side of the first panel region, wherein the first side tab comprises a first side tab transition region and a first side tab notch region, wherein the first side tab notch region comprises the first notch formed therethrough at a first distal end of the first side tab, wherein the first panel region extends along a first plane, wherein at least part of the first side tab notch region is at a second plane, the second plane being parallel with the first plane, wherein the first side tab transition region extends between the first panel region and the first side tab notch region, wherein the first side tab transition region extends and transitions from the first plane to the second plane, wherein the second side tab extends from a second side of the first panel region, wherein the second side tab comprising a second side tab transition region and a second side tab notch region, wherein the second side tab notch region comprising the second notch formed therethrough at a second distal end of the second side tab, wherein at least part of the second side tab notch region is at the second plane, wherein the second side tab transition region extends between the first panel region and the second side tab notch region, wherein the second side tab transition region extends and transitions from the first plane to the second plane, and wherein the first recessed panel region extends from the first plane toward the second plane and has a first recessed depth; and attaching a first suction cup to the first recessed panel region, such that the first suction cup is partially within the first recessed panel region and partially extending out of the first recessed panel region beyond the first plane.

13. The method of claim 12, further comprising attaching a first handle to a front side of the panel cover device.

14. The method of claim 12, wherein the forming on the panel cover device further comprises forming a first suction cup slot through the first recessed panel region, wherein the first suction cup slot has a first circular region at a first end of the first suction cup slot, wherein the first suction cup slot has a second circular region at a second end of the first suction cup slot, wherein the first circular region is separated from the second circular region by a first spaced distance, and wherein the second circular region has a smaller diameter than the first circular region; and wherein the attaching the first suction cup to the first recessed panel region comprises inserting a first suction cup end of the first suction cup into the first suction cup slot.

15. The method of claim 12, wherein each of the first notch and the second notch has a semi-circular shape, wherein the first panel region has a flat planar shape, wherein the first notch is configured to fit at least partially around a first knob of an instrument panel, and wherein the second notch is configured to fit at least partially around a second knob of the instrument panel, wherein the panel cover device is configured to removably attach to a display screen of the instrument panel via the first suction cup, and wherein the panel cover device is configured to be aligned with the display screen via the first notch and the second notch such that the first panel region sits against the display screen to obscure a first set of selected information on the display screen while revealing a second set of selected information on the display screen through the first elongated view slot and the first circular view hole, and while revealing a third set of selected information on the display screen outside outer boundaries of the first panel region.

16. The method of claim 12, wherein the forming on the panel cover device further comprises forming a second view slot through the first panel region.

17. The method of claim 12, wherein the forming on the panel cover device comprises thermoforming.

18. The method of claim 12, wherein the forming on the panel cover device comprises stamping.

19. The method of claim 12, wherein the forming on the panel cover device comprises injection molding.

* * * * *